United States Patent
Schicht et al.

(10) Patent No.: US 7,211,328 B2
(45) Date of Patent: May 1, 2007

(54) PRESTRESSABLE LOW-E LAYER SYSTEMS FOR WINDOW PANES

(75) Inventors: Heinz Schicht, Bethau (DE); Herbert Schindler, Torgau (DE); Lars Ihlo, Torgau (DE); Uwe Schmidt, Falkenberg (DE)

(73) Assignee: Saint-Gobain Glass France, Courbevoie (FR)

( * ) Notice: Subject to any disclaimer, the term of this patent is extended or adjusted under 35 U.S.C. 154(b) by 47 days.

(21) Appl. No.: 10/466,523

(22) PCT Filed: Jan. 23, 2002

(86) PCT No.: PCT/FR02/00275

§ 371 (c)(1),
(2), (4) Date: Feb. 12, 2004

(87) PCT Pub. No.: WO02/062713

PCT Pub. Date: Aug. 15, 2002

(65) Prior Publication Data

US 2004/0126591 A1    Jul. 1, 2004

(30) Foreign Application Priority Data

Feb. 6, 2001    (DE) ............................. 101 05 199

(51) Int. Cl.
*B32B 17/00* (2006.01)
(52) U.S. Cl. ............... 428/432; 428/688; 428/689; 428/697; 428/698; 428/699; 428/702; 428/704
(58) Field of Classification Search ............ 428/411.1, 428/426, 428, 432, 697, 698, 699, 701, 702, 428/469, 472, 434
See application file for complete search history.

(56) References Cited

U.S. PATENT DOCUMENTS

| | | | |
|---|---|---|---|
| 4,780,372 A * | 10/1988 | Tracy et al. | 428/428 |
| 5,344,718 A | 9/1994 | Hartig et al. | 428/623 |
| 5,376,455 A | 12/1994 | Hartig et al. | 428/428 |
| 5,387,433 A * | 2/1995 | Balian et al. | 427/126.3 |
| 5,425,861 A | 6/1995 | Hartig et al. | 204/192.26 |
| 5,506,037 A * | 4/1996 | Termath | 428/216 |
| 5,514,476 A | 5/1996 | Hartig et al. | 428/426 |
| 5,770,321 A | 6/1998 | Hartig et al. | 428/62 |
| 6,025,094 A * | 2/2000 | Visco et al. | 429/231.95 |
| 6,045,896 A * | 4/2000 | Boire et al. | 428/216 |
| 6,059,909 A | 5/2000 | Hartig et al. | 156/109 |
| 6,180,247 B1 | 1/2001 | Szczyrbowski et al. | 428/432 |
| 6,316,111 B1 | 11/2001 | Krisko | 428/434 |
| 6,432,545 B1 | 8/2002 | Schicht et al. | 428/432 |

FOREIGN PATENT DOCUMENTS

| | | |
|---|---|---|
| EP | 0 771 766 | 5/1997 |
| EP | 0 824 091 | 2/1998 |
| EP | 0 834 483 | 4/1998 |
| FR | 2 766 174 | 1/1999 |

* cited by examiner

*Primary Examiner*—Jennifer McNeil
*Assistant Examiner*—Elizabeth D. Ivey
(74) *Attorney, Agent, or Firm*—Oblon, Spivak, McClelland, Maier & Neustadt, P.C.

(57) ABSTRACT

A multilayer film, capable of withstanding high thermal stresses, with silver as functional layer, a sacrificial metal layer placed on top of the silver layer and antireflection dielectric layers, has a metal nitride layer between the silver layer and the sacrificial metal layer. This metal nitride layer is composed in particular of $Si_3N_4$ and/or AlN and constitutes an effective diffusion barrier. The optical and energy properties of the silver layer consequently remain, for the most part, preserved, even after undergoing high thermal stresses (for example of the bending or toughening type when curving and/or prestressing a window pane provided with the multilayer film).

15 Claims, No Drawings

PRESTRESSABLE LOW-E LAYER SYSTEMS FOR WINDOW PANES

FIELD OF THE INVENTION

The invention relates to a low-E multilayer film, capable of withstanding thermal stresses, for windows (intended to be fitted into buildings or vehicles), in particular made of glass and having one or more silver-based functional layers, a sacrificial metal layer placed on top of the silver, layer, a lower antireflection dielectric layer close to the surface of the substrate, and an upper antireflection layer.

BACKGROUND OF THE INVENTION

Windows provided with a multilayer film having a low-E (low-E means "low emissivity", and consequently a low emissivity or high reflection of waves in the infrared spectrum) serve in particular to improve the thermal insulation of windows in buildings and vehicles. The actual thermal insulation function is provided in this case, most of the time, by one or more silver layers (called "functional layer(s)". In the case of insulating window panes for example, radiative exchange between panes may be almost completely blocked by using windows of the double-glazing type having an emissivity $E \leq 0.1$ on the face turned toward the space between the two glass panes. It is thus possible to manufacture insulating window panes having a k value of 1.1 $W/m^2K$.

Window panes provided with optimized low-E multilayer films must also have an overall energy transparency that is as high as possible (the highest possible g value) in order to be able to use the incident solar energy for the energy budget of a building. Finally, the transmission must be as high as possible in the visible range of the spectrum. The color in reflection of coated window panes must be of neutral color, as is the case for conventional insulating window panes.

In certain cases, it is necessary or appropriate to subject windows (at least one of the glass panes of which is it composed) provided with a low-E multilayer film of this kind to a curving or prestressing treatment, of the bending or toughening type. For this purpose, the glass panes are heated before the actual curving or prestressing treatment to a temperature of about 550° C. to 650° C. During this thermal stressing, the silver layer often undergoes structural modifications because of oxidation and diffusion processes. These modifications of the silver layer are manifested, even if they cannot be seen by the naked eye, by a deterioration in the energy values, in particular the transmission and emissivity values. When, for example, insulating window panes made from two glass panes 4 mm in thickness with an argon-filled intermediate space 16 mm in thickness have to have a k value of 1.1 $W/m^2K$, the emissivity of the multilayer system of the glass panes must at most be only 5%. This corresponds to an electrical resistance of at most 4.5 ohms per unit area.

There is a strong demand for multilayer films of this kind, which are capable of withstanding high thermal stresses, the emissivity and the diffuse dispersion (haze) of which are very low; even after a heat (prestressing) treatment, with the optical properties preserved, without the other quality criteria of the film, such as hardness, color and corrosion resistance, being disturbed thereby.

Various suggestions have already been made for the purpose of improving multilayer films of this kind. The desired optical and energy values of coated window panes must therefore be more or less maintained, even in the case of window panes made of glass which, after having been coated with layers, are subjected to a curving or prestressing operation. Deterioration in the properties of the layers as a result of the heat treatment must be prevented or at the very least limited.

Document DE-A1-196 32 788 discloses a prestressable multilayer film of the kind mentioned above, for which the antireflection dielectric layers are composed of an oxide of the metals Sn, Zn, Ti, Si or Bi, or of SiN or AlN, and the sacrificial metal layer of an AlMgMn alloy. The sacrificial metal layer has a thickness of 5 to 10 nm. The term "prestressable" refers in this case to multilayer films of this kind which withstand the high temperatures of the bending and/or toughening operations without significant degradation.

Document DE-A1-196 40 800 describes a silver-based multilayer film having, between the sacrificial metal layer and the upper antireflection layer, an interlayer made of an oxide, a nitride or an oxynitride of the metal of the sacrificial metal layer. The upper antireflection treatment layer is composed of an oxide, a nitride or an oxynitride of a metal other than the metal of the sacrificial metal layer. It may also be a superposition of at least two layers of this type. The term "upper" means that the layer or layers in question lies or lie above the functional layer or at least one of the functional layers of the film, as opposed to the term "lower".

Documents EP-B1-0 567 735, EP-B1-0 717 014, EP-B1-0 771 766, EP-B1-0 646 551 and EP-A2-0 796 825 disclose prestressable multilayer films having a silver layer as functional layer, with two antireflection layers being each time composed of $Si_3N_4$, and the sacrificial metal layer of Ni or NiCr.

The prestressable multilayer film described in document EP-B1-0 883 584 has antireflection layers preferably made of $Si_3N_4$, the sacrificial metal layer being composed in this case, however, of silicon.

A prestressable multilayer film, known from document DE-A1-198 50 023, is characterized in that an $NiCrO_x$ suboxidized layer having a thickness of between 0.1 et 0.2 nm is embedded in the surrounded silver layer placed between a lower sacrificial metal layer and an upper sacrificial metal layer. The sacrificial metal layers are composed of suboxidized $NiCrO_x$ or of suboxidized $NiCrO_x$ and suboxidized $TiO_2$. This known multilayer film must allow coated glass window panes to be prestressed and curved without thereby appreciably modifying the optical properties of the multilayer film. The diffuse dispersion (haze) after the heat treatment must in particular be less than 5%.

Document DE-C1-198 52 358 describes a low-E multilayer film capable of withstanding high thermal stresses, having a glass/MeO/ZnO/Zn/Ag/AlMe/MeO/$Zn_xMe_yO_n$ sequence of layers. The AlMe sacrificial metal layer is in this case, as a constituent of the alloy above the silver layer, an alloy of aluminum with one or more of the elements Si, Mg, Mn, Cu and Zn.

None of the known multilayer films fulfills all of the essential properties in an optimal manner. In most cases, after the heat treatment, the multilayer films have too high an emissivity and a relatively high diffuse dispersion (haze).

The objective of the invention is to further improve a low-E multilayer film capable of withstanding high thermal stresses, as mentioned above.

SUMMARY OF THE INVENTION

In accordance with the invention, this objective is achieved by using a multilayer film comprising one or more silver-based functional layers, a sacrificial metal layer placed on top of the silver layer, a lower antireflection dielectric layer close to the surface of the substrate, and an upper antireflection layer. It should be understood that multilayer films of this kind are not necessarily used exclusively on glass substrates—they may also be judiciously used/deposited on substrates made of other transparent (synthetic) material (for example, polycarbonate, polymethyl methacrylate PMMA, polyethylene terephthalate PET, etc). Of course, synthetic (polymer-based) materials are not capable of withstanding temperatures as high as glass.

DETAILED DESCRIPTION OF THE INVENTION

It has been found that a metal nitride layer between the silver layer and the sacrificial metal layer represents an effective barrier. It prevents or greatly reduces the diffusion of the atoms of the sacrificial metal layer into the silver layer, and vice versa. This is because metal nitrides are relatively stable compounds which, from their standpoint, have no tendency to undergo diffusional movements into the silver layer. In this way the silver layer preserves (to a large extent), on its particularly threatened upper adjacent surface, its original structure even after being subjected to high thermal stress. Good optical and energy properties of the assembly are thus essentially preserved.

The sacrificial metal layer is preferably composed of Cr, Ni, Al, Ti, Mg, Mn, Si, Zn or Cu, or of an alloy of these metals.

A sacrificial metal layer may also be provided beneath the silver layer. This sacrificial metal layer is also preferably composed of one of the metals mentioned or of an alloy of these metals. In this case, a metal nitride layer is also placed between the sacrificial metal layer and the silver layer.

In the case of multilayer films for which the silver layer is deposited on a partially crystalline ZnO layer, it is unnecessary to use a metal nitride layer beneath the silver layer.

The antireflection lower layer and the antireflection upper layer may consist of an individual layer of oxide(s) and/or nitride(s) and/or oxynitride(s), or of a superposition of several individual layers of this kind.

The individual layers and their thickness are selected within the context described, in such a way that the optical values, such as the transmission and the color in reflection of the coated substrate (made of glass), are significantly and reproducibly modified during the heat treatment. In particular, the light transmission is markedly increased and the color in reflection undergoes, after the heat treatment, a "color box change". The term "color box change" is understood by experts to mean a modification in the coloring or tint (color in reflection) of a layer or of a multilayer film. The possible colors may be described within the context of a special coordinate system, for example the L,a*,b* colorimetry system. Because the layer colors cannot be reproduced absolutely precisely in this coordinate stack, color tolerance ranges are drawn up between suppliers and customers, which are then denoted by the term "color box". The expression "color box change" is then understood to mean a modification in the coloring or tint such that it goes beyond the limits of a first color box (initial state) into another color box (target state or setpoint state).

After the heat treatment, the diffuse dispersion is at most 0.3% and the emissivity at most 5%. The multilayer film must, of course, also fulfill all the other requirements relating to the chemical-resistance and use properties which are normally required for multilayer films of this kind.

This is why the multilayer film according to the invention may also be used entirely without a post-deposition heat treatment being involved, in particular on suitable plastic substrates (for example made of polycarbonate), owing to the fact that its very good thermal insulation properties are not substantially modified by the heat treatment.

The invention will be described below in greater detail with reference to two embodiment examples, which are compared each time with a comparative example in accordance with the prior art. In this case, in order to evaluate the multilayer film properties on coated glass panes, the following measurements and tests were carried out:

A. Measurement of the light transmission T at 550 nm;

B. Measurement of the color parameters in reflection in the (L,a*,b*) system;

C. Measurement of the surface electrical resistance;

D. Measurement of the emissivity E using the Sten Löfving MK2 apparatus;

E. Condensation water test according to the DIN 50017 standard with visual evaluation;

F. Measurement of the electrochemical resistance (EMK test); this test is described in *Z. Silikattechnik* 32 (1981), page 216. The test is used to evaluate the resistance to passivation of the upper layer above the silver layer and the corrosion behavior of the Ag layer;

G. Erichsen scrubbing test according to the ASTM 2486 standard, with visual evaluation;

H. Measurement of the scratch resistance; in this case, a weighted needle is drawn at a defined rate over the film. The weight in g for which scratch lines become visible serves as a measure of the scratch hardness; and I. Measurement of the scattered light in % using the light scattering meter from Gardner.

COMPARATIVE EXAMPLE 1

An industrial sputtering plant for producing multilayer coatings was used to apply, to float glass specimens, in accordance with the prior art, by means of the process of reactive sputtering assisted by a magnetic field, the following multilayer film (the thickness of the individual layers is indicated each time in nm):

Glass/25 $SnO_2$/9 ZnO:Al/11.6 Ag/6 AlMgMn/38 $SnO_2$/2 $ZnSnSbO_x$.

The ZnO:Al layer was applied by reactive sputtering using a ZnAl metal target containing 2% Al by weight. The sacrificial metal layer was applied by sputtering using a metal target, containing 94% Al by weight, 4.5% Mg by weight and 1% Mn by weight. The uppermost partial layer of the upper antireflection layer was deposited by reactive sputtering using a metal target composed of 68% Zn by weight, 30% Sn by weight and 2% Sb by weight.

The results from the abovementioned tests, on several specimens, before the heat treatment, gave the following values:

| A. | Transmission | $T_{550}$ = 76–77% |
|---|---|---|
| B. | Color parameters | a* = 4.06 |
| | | b* = −7.17 |
| C. | Electrical resistance | R = 6.8–6.9 ohms/area |
| D. | Emissivity | E = 7.7% |
| E. | Condensation water test | Red stains |
| F. | EMK test | 132 mV |

-continued

| G. | Scrubbing test | 350 to-and-fro movements with moderate scratching |
| --- | --- | --- |
| H. | Scratch hardness | 65–132 g |
| I. | Scattered light | 0.17%. |

Several specimens of the coated glass were heated to 650° C. and prestressed by sudden cooling (quenching). The tests or measurements carried out on the prestressed glass specimens gave the following results:

| A. | Transmission | $T_{550}$ = 88.9% |
| --- | --- | --- |
| B. | Color parameters | $a^*$ = 1.0 |
| | | $b^*$ = −5.1 |
| C. | Electrical resistance | R = 4.3 ohms/area |
| D. | Emissivity | E = 5.3% |
| H. | Scratch hardness | 64–208 g |
| I. | Scattered light | 0.35%. |

The significant differences in the $a^*$ and $b^*$ color coordinates going from the unprestressed state to the prestressed state of the glass specimens show the "color box" change in question of the multilayer film.

EMBODIMENT EXAMPLE 1

The following multilayer film according to the invention was manufactured on the same coating plant as in the case of the comparative example:

Glass/25 $SnO_2$/9 ZnO:Al/11.5 Ag/3 $Si_3N_4$/5 AlMgMn/38 $SnO_2$/2 $ZnSnSbO_x$.

The measurements and tests on the coated glass specimens before the heat treatment gave the following values:

| A. | Transmission | $T_{550}$ = 75.5% |
| --- | --- | --- |
| B. | Color parameters | as for the comparative example |
| C. | Electrical resistance | R = 6.7 ohms/area |
| D. | Emissivity | E = 7.5% |
| E. | Condensation water test | No error |
| F. | EMK test | 44 mV |
| G. | Scrubbing test | 350 to-and-fro movements with no scratching |
| H. | Scratch hardness | 64–218 g |
| I. | Scattered light | 0.14%. |

After prestressing, the same measurements and tests as those in the case of the comparative example were carried out on several specimens, and gave the following results:

| A. | Transmission | $T_{550}$ = 88% |
| --- | --- | --- |
| B. | Color parameters | as for the comparative example |
| C. | Electrical resistance | R = 3.6 ohms/area |
| D. | Emissivity | E = 4.0% |
| H. | Scratch hardness | 70–200 g |
| I. | Scattered light | 0.25%. |

The light transmission of the multilayer film or of the coated glass specimens increases very considerably during the heat treatment, the emissivity being even lower than in the comparative example. The color values are modified in a manner similar to that of the comparative example, which means that the "target color box" is also reliably achieved thanks to the multilayer film according to the invention.

COMPARATIVE EXAMPLE 2

The following multilayer film corresponding to the prior art was manufactured on the same coating plant as in the case of the previous examples:

Glass/25 $SnO_2$/9 ZnO:Al/11.5 Ag/3 ZnAl/38 $SnO_2$/2 $ZnSnSbO_x$.

The sacrificial metal layer was deposited by sputtering using a metal target containing 98% Zn by weight and 2% Al by weight.

The EMK test was carried out on the glass specimens coated with this multilayer system, this test giving a value of 120 mV. The specimens were then subjected to a prestressing treatment. After prestressing, the film had a slight haze. Measurements were carried out on the prestressed glass specimens for the three most important parameters, namely the measurement of the emissivity E, the surface electrical resistance and the scattered light. The measurements gave the following values:

| C. | Electrical resistance | R = 3.2 ohms/area |
| --- | --- | --- |
| D. | Emissivity | E = 7.3% |
| I. | Scattered light | 0.46%. |

EMBODIMENT EXAMPLE 2

Glass specimens with the following multilayer film according to the invention were manufactured, again on the same coating plant as in the case of the previous examples:

Glass/25 $SnO_2$/9 ZnO:Al/11.5 Ag/3 $Si_3N_4$/3 ZnAl/38 $SnO_2$/2 $ZnSnSbO_x$.

Carrying out the EMK test before prestressing gave a value of 8 mV. Visual examination also showed, after prestressing, a film free of optical defects. The same tests as in the case of the comparative example were carried out on the prestressed glass specimens. They gave the following values:

| C. | Electrical resistance | R = 3.27 ohms/area |
| --- | --- | --- |
| D. | Emissivity | E = 4.2% |
| I. | Scattered light | 0.29%. |

If the properties of the glass specimens coated according to the invention after prestressing are compared with those of the comparative examples, it is clear that a marked improvement is obtained in both cases by inserting the 3 nm thick $Si_3N_4$ layer between the silver layer and the sacrificial metal layer. This is particularly the case as regards corrosion resistance, emissivity and scattered light.

The invention also applies to films comprising several functional layers, especially two silver layers: in this case, the nitride layer according to the invention is inserted on one of the silver layers at least, especially on both or only one of them.

The invention claimed is:

1. A windowpane comprising a transparent substrate and a multilayer film, wherein the multilayer film comprises in the following order (i) a lower antireflection layer closest to the transparent substrate; (ii) a layer comprising silver; (iii) a layer comprising a metal nitride; (iv) a sacrificial metal layer; and (v) an upper antireflection layer, and wherein the sacrificial metal layer contacts the layer comprising a metal nitride and the layer comprising a metal nitride contacts the layer comprising silver.

2. The window pane of claim 1, wherein the transparent substrate is glass.

3. The window pane of claim 1, wherein the layer comprising the metal nitride is $Si_3N_4$, AlN, or a combination thereof.

4. The window pane of claim 1, wherein the layer comprising a metal nitride has a thickness ranging from 0.5 to 5 nm.

5. The window pane of claim 4, wherein the layer comprising a metal nitride has a thickness ranging from 1 to 5 nm.

6. The window pane of claim 1, wherein the composition of the layer comprising a metal nitride is about stoichiometric.

7. The window pane of claim 1, wherein the sacrificial metal layer is selected from the group consisting of Cr, Ni, Al, Ti, Mg, Mn, Si, Zn, Cu, and alloys thereof.

8. The window pane of claim 1, further comprising a partially crystalline ZnO:Al layer disposed between the substrate and the layer comprising silver, wherein the ZnO:Al layer contacts the layer comprising silver.

9. The window pane of claim 1, further comprising (vi) a second layer comprising a metal nitride disposed between the substrate and the layer comprising silver, wherein the second layer comprising a metal nitride contacts the layer comprising silver and (vii) a second sacrificial metal layer disposed between the substrate and the second layer comprising a metal nitride, wherein the second sacrificial metal layer contacts the second layer comprising a metal nitride.

10. The window pane of claim 9, wherein the second sacrificial layer is selected from the group consisting of Cr, Ni, Al, Ti, Mg, Mn, Si, Zn, Cu, and alloys thereof.

11. The window pane of claim 1, having the structure:
substrate/$SnO_2$/ZnO:Al/Ag/$Si_3N_4$/AlMgMn/$SnO_2$/ZnSbO$_x$.

12. The window pane of claim 1, having the structure: substrate/$SnO_2$ at a thickness of 25 nm/ZnO:Al at a thickness of 9 nm/Ag at a thickness of 11 nm/$Si_3N_4$ at a thickness of 3 nm/ZnAl at a thickness of 3 nm/$SnO_2$ at a thickness of 38 nm/ZnSnSbO$_x$ at a thickness of 2 nm.

13. The window pane of claim 1, having a transmission T550 ranging from 84% to 88%.

14. The window pane of claim 1, having a diffuse dispersion ranging from 0.2% to 0.3 5%.

15. The window pane of claim 1, having an emissivity on the multilayer side of the window pane ranging from 4% to 5%.

* * * * *